Dec. 13, 1932.  F. A. LINDGREN  1,891,191
MINING MACHINE
Original Filed Dec. 31, 1926   2 Sheets-Sheet 1
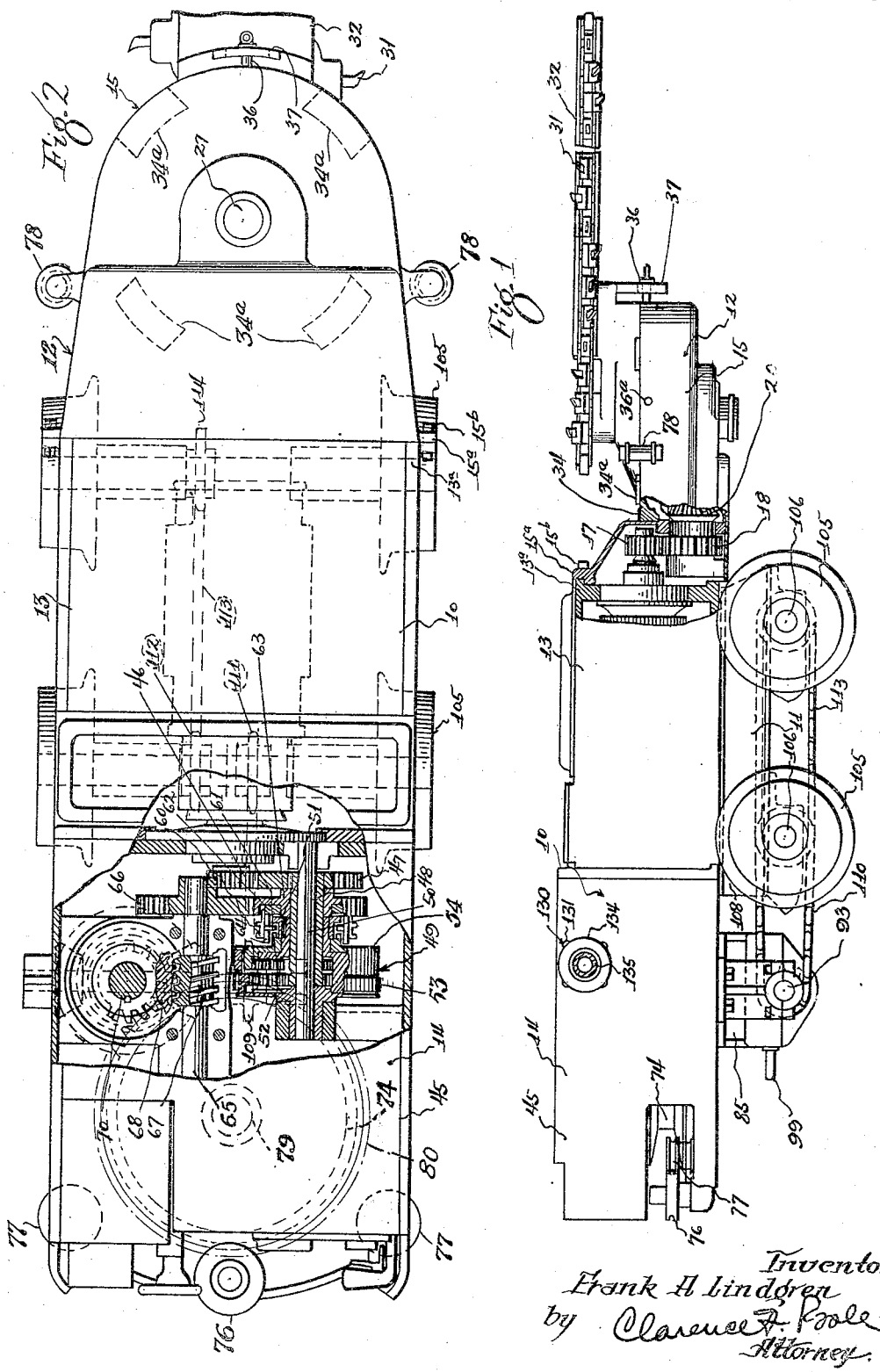
Inventor
Frank A Lindgren
by Clarence F. Poole
Attorney Dec. 13, 1932.  F. A. LINDGREN  1,891,191
MINING MACHINE
Original Filed Dec. 31, 1926  2 Sheets-Sheet 2
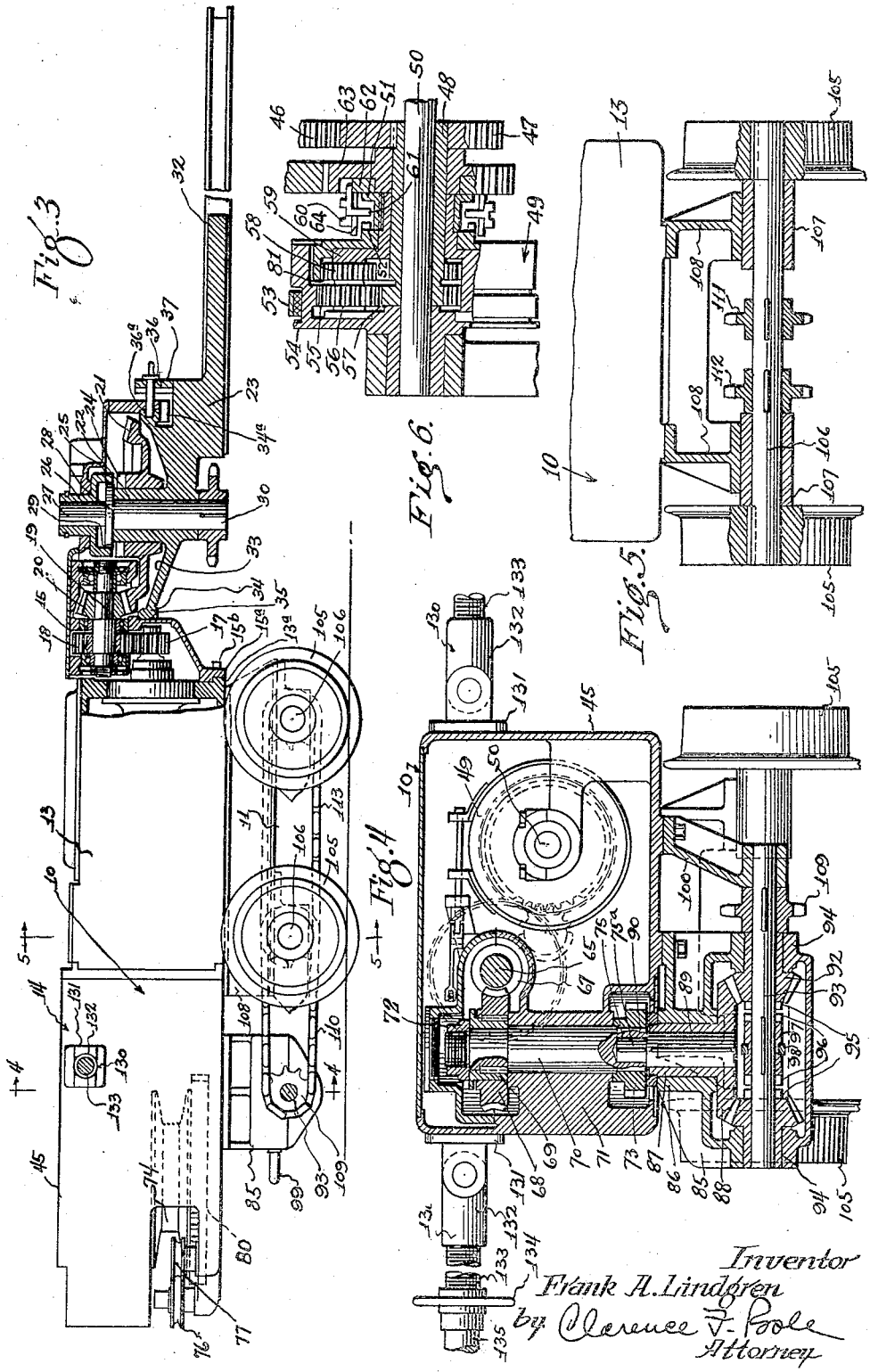

Patented Dec. 13, 1932

1,891,191

UNITED STATES PATENT OFFICE

FRANK A. LINDGREN, OF WESTERN SPRINGS, ILLINOIS, ASSIGNOR TO GOODMAN MANUFACTURING COMPANY, OF CHICAGO, ILLINOIS, A CORPORATION OF ILLINOIS

MINING MACHINE

Application filed December 31, 1926, Serial No. 158,211. Renewed June 22, 1931.

This invention relates to improvements in kerf cutting mining machines, and more particularly to a mining machine of the longwall type adapted to cut along the mine bottom on its own bottom or be mounted on and cut from a track mounted truck and has as its principal objects to provide a machine of this class wherein the feeding and transportation of the machine is controlled through variable speed drive mechanism to provide a machine having an invertible cutter head whereby kerfs on different horizontal planes may be cut; and to provide a machine of this character capable of cutting in narrow places having holding means therefor for positively positioning and holding the machine in fixed relation with respect to the mine wall while cutting in narrow places.

Other objects and advantages of my invention will appear from time to time as the following specification proceeds.

My invention will be best understood with reference to the accompanying drawings wherein:

Figure 1 is a side elevation of the machine embodying my invention, illustrating the cutter bar disposed in a position to make a top cut; a portion of the front housing of the machine parts being broken away and in section;

Figure 2 is a plan view of the machine mounted on the truck, having a portion of the rear housing of the machine parts broken away to show the details of the gearing for the feed and truck driving mechanism;

Figure 3 is a side elevation of the machine, illustrating the cutter bar disposed in a position for center cutting with certain parts broken away and in section to show the means for supporting the cutter bar and the details of the drive to the cutter chain;

Figure 4 is a cross-section taken through the machine on line 4—4 of Figure 3;

Figure 5 is a view taken on line 5—5 of Figure 3, illustrating the drive for the rear truck axles; and Figure 6 is an enlarged fragmentary sectional view of the planetary gear mechanism shown in Figure 2.

Referring now in detail to the drawings, a longwall mining machine is indicated generally by reference character 10. The mining machine 10 is adapted to be detachably mounted on a track mounted truck 11 for cutting or for transportation from working place to working place and includes three main elements; viz., a motor 13, an invertible cutter head 12 extending forwardly of said motor and having a cutter bar 32 extending forwardly therefrom, which cutter bar has a cutter chain 31 movable thereabout in a closed orbital path, and feed operating and truck driving mechanism, generally indicated by reference character 14, disposed rearwardly of said motor.

The cutter head 12 includes a supporting frame 15 for supporting the cutter bar 32 and carrying drive mechanism for driving the cutter chain 31 about said cutter bar. The supporting frame 15 is provided with a rearwardly extending flange 15a adjacent one side thereof, said flange is herein shown as being on the lower side of the cutter head 12 when said cutter head is adjusted for center cutting, as is shown in Figure 3. The flange 15a is adapted to be detachably connected to one of a plurality of corresponding flanges 13a formed integral with the forward end of the housing of the motor 13, in a suitable manner; as, for instance, by means of cap screws 15b, 15b. The construction of the supporting frame 15 and the arrangement of the driving mechanism therein permits the complete cutter head 12, including the cutter bar 32, to be inverted so said cutter bar may be disposed in position for either top or bottom cutting, in a manner which will hereinafter be more fully described.

Referring now to the mechanism for driving the cutter chain 31 about the cutter bar 32, a pinion 17 is keyed on the forward end of the shaft for the motor 13 and meshes with a gear 18 which is secured adjacent the rearward end of a longitudinally extending stub shaft 19. The stub shaft 19 is suitably supported in bearings carried by the supporting frame 15. A bevel pinion 20 is disposed on the stub shaft 19 forwardly of the gear 18, and has driving engagement with a bevel gear 21 which is journaled on its hub on an upstanding hub portion 22 formed integral with a bracket 23 for supporting the cutter bar 32.

A pair of clutch jaws 24, 24 are provided on the upper end of the hub of the bevel gear 21. The clutch jaws 24 are adapted to be engaged with coacting clutch jaws 25, 25 depending from a sliding clutch member 26 which is loosely mounted on the upper end of a vertically disposed cutter chain drive shaft 27. The shaft 27 is provided with a shoulder or ring 28 having apertures 29, 29 therein through which depend the clutch jaws 25, 25 while simultaneously engaging the coacting clutch jaws 24, 24 on the bevel gear 21, thereby affording a driving connection to said shaft. The clutch member 26 is operated by means of suitable lever mechanisms (not shown), in a manner well known to those skilled in the art.

The ring 28 of the shaft 27 abuts the upper end of the hub portion 22. The shaft 27 extends through and is journaled within the hub portion 22 and is provided with a drive sprocket 30 keyed on the end thereof opposite the clutch member 26 for driving the cutter chain 31 about the cutter bar 32.

The cutter bar 32 is mounted for pivotal swinging movement with respect to the cutter head 12 in a horizontal plane in the following manner:

The supporting bracket 23 is provided with a dished portion 33 integral with the hub portion 22. The dished portion 33 is provided with an annular bearing ring 34 formed at its outer edge, the outer periphery of which bearing abuts a suitable bearing surface formed around the inner periphery of the supporting frame 15 and its inner edge abuts a shouldered portion 35 formed in the inner periphery of the supporting frame 15. A plurality of supporting clips 34a, 34a are bolted to the underside of the supporting frame 15, at about 90° apart, and engage the outer side of the bearing ring 34 and provide a bearing support for said bearing ring.

As has before been mentioned, the cutter head 12 may be inverted so the cutter bar 32 may cut at various elevations with respect to the mine bottom. The cutter head 12 is inverted by removing the cap screws 15b and turning said cutter head over and replacing said cap screws when said cutter head has been inverted and is properly positioned with respect to the casing for the motor 13. It should be noted that the gear 18 is spaced from the motor pinion 17 in such a manner that it may mesh with and be driven by said pinion when the cutter head 12 is in a normal or inverted position with respect to the rest of the machine so the cutter chain 31 may be driven about the cutter bar 32 when said cutter bar is arranged to cut in an elevated or depressed position.

The cutter bar 32 may be held in various angular positions relative to the longitudinal axis of the machine in planes parallel to the ground and is preferably disposed at right angles thereto when making a slabbing cut in the mine wall. It should be understood that the cutter bar 32 may be fed into the coal by movement of the truck 11 along the track and that said cutter bar may cut a kerf across the front of the machine effected by swinging said cutter bar about the axis of the cutter chain drive shaft 27 by the feeding mechanism in a usual manner.

A pin 36 is provided to hold the cutter bar 32 in its several cutting positions when desired. The pin 36 is carried by a projection 37 extending from the supporting bracket 23 of the cutter bar 32 and is adapted to register with one of a number of apertures 36a formed in the outer periphery of the supporting frame 15 and corresponding aligned apertures formed in the bearing ring 34 formed integral with the bracket 23 for supporting the cutter bar 32.

The projection 37 is adapted to be engaged by a mining machine feed cable (not shown) to pivot and bring the cutter bar 32 in any one of the several cutting positions and for feeding said cutter bar in an arcuate path across the face of the coal. Said cable is wound on or payed off a winding drum 74 at the rearward end of the machine in a usual manner, which will hereinafter be described.

Referring now in particular to the details of the feed operating mechanism, I provide a combination housing and frame, indicated generally at 45, detachably connectible to the rearward end of the motor casing and having the bottom thereof in alignment with the bottom of said motor casing, so as to provide a continuous surface to permit the complete mechanism to slide along a mine bottom on its own bottom when cutting as a longwall machine, or to permit said machine to be mounted on the truck 11 for transportation or cutting from said truck.

The rearward end of the shaft of the motor 13 is provided with a pinion 46 meshing with a gear 47 which is keyed adjacent one end of a sleeve member 48 of a planetary geared speed reduction device 49 and freely mounted on a shaft 50. The planetary geared speed reduction device 49 is journaled in a suitable bearing bracket extending upwardly from the bottom of the housing and frame 45 and is freely mounted on the shaft 50 and sleeve member 48. The planetary geared speed reduction device 49 is of a usual type and includes high and low speed connections herein comprising clutch jaws 51, 51 and 52, 52, respectively.

The planetary geared speed reduction device 49 is frictionally controlled at both high and low speeds by means of a friction band 53 engageable with an outer periphery of a casing 54 for said planetary geared speed reduction device, which casing carries an internal gear 55 meshed with planetary pinions 56 driven from a sun gear 57 on the inner end of the sleeve member 48. Planetary pinions 58 are formed integral with the planetary pinions 56 to one side thereof and are of smaller diameter than said planetary pinions. The planetary pinions 56 and 58 are carried in a suitable cage 59 journaled on the sleeve member 48. The planetary pinions 58 mesh with and drive an internal gear 81, said internal gear being provided with a suitable hub portion journaled for rotation about the hub of the cage 59 which has the low speed clutch jaws 52 formed integral therewith. The high speed clutch jaws 51 are in turn keyed to a suitable sleeve formed integral with the cage 59. It is thus apparent that slippage of the casing 54 in the friction band 53 varies the speed of rotation of the internal gear 81 and cage 59 and that a suitable frictionally controlled drive is provided for the mechanism driven from the planetary geared speed reduction device 49. The friction band 53 is engaged with or disengaged from the casing 54 of the planetary geared speed reduction device 49 by means of a suitable system of levers, of a type well known to those skilled in the art, and controlled from the rearward end of the machine in a usual manner.

A sliding clutch member 60 is slidably mounted on a ring member 62 which is attached to and has driving connection with a web portion of a driving gear 63. The gear 63 is loosely mounted on the sleeve member 48 adjacent the gear 47. The clutch member 60 is provided with a plurality of inwardly extending radial clutch jaws 61 registering with and extending through grooves 64 formed in the ring member 62 for selective engagement with either the clutch jaws 51 or 52 for driving the gear 63 at either a high or low frictionally controlled speed.

A longitudinally extending shaft 65 is journaled in suitable bearings extending upwardly from the bottom of the housing and frame member 45 and is provided at the forward end thereof with a gear 66 meshed with and driven by the gear 63 on the sleeve member 48. A worm 67 is formed integral with the shaft 65 and meshes with a worm gear 68 mounted on a vertically disposed sleeve member 69, which sleeve member is in turn keyed adjacent the upper end of a vertically disposed shaft 70, which shaft is journaled in and extends through a suitable bearing 71 formed integral with the frame 45. The shaft 70 is held from vertical downward movement by the lower end of the sleeve member 69 which has bearing engagement with the upper side of the bearing 71. A nut 72 is provided on the upper end of the shaft 70 and abuts the upper end of the sleeve member 69 (see Fig. 4).

A pinion 73 is keyed on the shaft 70 adjacent its lower end and its hub has thrusting engagement with the lower end of the bearing 71. The pinion 73 meshes with and drives a spur gear 80 loosely mounted on a vertical stub shaft 79. The winding drum 74 is loosely mounted on the stub shaft 79 above the gear 80. The winding drum 74 is adapted to be selectively driven by the gear 80 through a suitable system of clutches in a usual manner (not shown). A suitable cable (not shown) is adapted to be wound on the winding drum 74 and attached to the projection 37 of the bracket 23 supporting the cutter bar 32 for adjusting said cutter bar to the desired cutting position or for feeding said cutter bar into the coal face or across the front of the mining machine 10. Said cable may also be attached to a fixed abutment remote from the machine for feeding the cutter bar 32 into or along the coal face where cutting conditions are hard when mounted on the truck 11, it being understood that the machine is manipulated and fed in a manner usual to longwall machines when cutting on its own bottom along the mine bottom.

Suitable means are provided for directing the cable in the desired directions for feeding or positioning the machine or cutter bar 32, which herein comprise a guide sheave 76 disposed adjacent the central portion of the rearward end of the machine and guide sheaves 77, 77 disposed adjacent opposite sides of the rearward end of the machine. Guide rollers 78, 78 are likewise provided on opposite sides of the supporting frame 15 for guiding the cable when connected to the projection 37 for pivoting the cutter bar 32.

The driving mechanism for the truck 11 includes a gear housing and frame member 85 disposed at the rearward end of the truck 11 and adapted to be detachably secured to the underside of the housing 45 in a suitable manner, such as cap screws or nuts and bolts. A vertical bearing 86 is formed integral with the housing 85. The bearing 86 affords a bearing support for a hub portion 87 of a bevel gear 88 which extends therethrough. The hub portion 87 is keyed on a vertical coupling drive shaft 89 which is disposed in axial alignment with and below the shaft 70. The upper end of the shaft 89 is provided with a reduced portion 90 which is adapted to register with a recess 75 formed in the lower end of the shaft 70. The coupling drive shaft 89 is driven from the shaft 70 when connected thereto by means of a feather key 75a. The bevel gear 88 is meshed with and drives a pair of oppositely disposed bevel pinions 92, 92 loosely mounted on a transversely extending drive shaft 93. The bevel pinions 92, 92 are provided with hub extensions which are mounted in bearings 94, 94 formed integral with the housing 85. The end of the shaft 93, opposite the bevel pinions 92, 92, is journaled in a bracket 100 detachably secured to and depending from the underside of the housing 45.

Each of the bevel pinions 92 is provided with clutch jaws 95, 95 at their ends opposite their hub extensions. The clutch jaws 95, 95 are adapted to be selectively engaged by corresponding clutch jaws 96, 96 on a sliding clutch member 97 feathered on the shaft 93 intermediate the bevel pinions 92, 92 for driving the shaft 93 in opposite directions without reversal of the motor 13.

The sliding clutch member 97 is moved along the shaft 93 for driving said shaft from either of the bevel pinions 92, 92 by means of a shifting collar 98 operated by a suitable hand lever 99 at the rearward end of the housing 85 in a usual manner. It is now clear that the drive shaft 93 may be selectively driven at either a high or low speed in one direction or another without reversal of the motor 13 through the gearing as hereinbefore set forth, and that these speeds are variable and under the control of the friction band 53 engageable with the planetary geared speed reduction device 49 as hereinbefore described.

Referring now to the details of the truck 11, said truck is supported on flanged supporting wheels 105, 105 keyed to the outer ends of a pair of parallel spaced, transversely disposed axles 106, 106, which axles are journaled in bearings 107, 107 mounted in suitable brackets depending from a truck frame 108. The truck frame 108 is in turn adapted to be detachably secured to the underside of the casing for the motor 13, in a manner well known to those skilled in the art.

The wheels 105, 105 are driven from the transverse shaft 93 by means of a sprocket 109 keyed thereto adjacent the inner side of the bearing bracket 100. A drive chain 110 is trained around the sprocket 109 and has driving engagement with a sprocket 111 keyed on the rearward axle 106. The forward axle 106 is driven from the rearward axle 106 by means of a drive sprocket 112 on said rearward axles, drive chain 113 and drive sprocket 114 on said forward axle.

When cutting in narrow places, the cutter bar 32 is either sumped into the coal by bodily movement of the truck 11 along the track, or by pivotal movement of said cutter bar about the axis of the cutter chain drive shaft 27 effected by the truck wheels 105, 105 or winding drum 74 depending upon the hardness of the cutting. When the kerf is cut by movement of the cutter bar 32 about the axis of the cutter chain drive shaft 27, a feed or draft rope (not shown) extending from the winding drum 74 is attached to the projection 37 and power is applied to said winding drum, as the cutter chain 31 is in motion, to pivot said cutter bar so it may sump or cut its way into the coal and cut a kerf across the front of the truck 11, the mining machine itself being held in a stationary position on the track during the cutting operation by means of jacks 130, 130.

The jacks 130, 130 are carried by clevis brackets 131, 131 secured to the housing 45, in a suitable manner, for movement about axes extending longitudinally of the machine and include members 132, 132 having threaded shafts 133, 133 secured thereto, which members are pivotally mounted on said clevis brackets by means of suitable pivot pins in a usual manner. Internally threaded sleeves 135, 135, having points on their outer ends (not shown) for engagement with the mine wall, are threaded on the threaded shafts 133, 133 and are moved along said shafts by means of hand wheels 134, 134 secured thereto. Thus the jacks 130, 130 may be engaged with the mine roof or sides of the entry for holding the machine in a stationary position when cutting across the front of the truck 11 in narrow places.

It may now be seen that a mining machine has been provided which is of such an arrangement as will permit the cutting operations to be carried out in an expeditious and economical manner, that the cutting mechanism may be quickly dismounted from the truck by removing the attaching bolts so the machine may be fed along the coal face on its own bottom by means of the feed operating mechanism 14 for cutting in the manner usual to longwall machines, and that said machine may efficiently cut from the truck 11 along long faces or in narrow places.

It may also be seen that the truck and drive therefor, illustrated herein, permits ready handling of the machine with a greater degree of safety than with the usual machine, especially when traveling around sharp turns, over rough or irregular track, or positioning the machine for cutting inasmuch as the speed of the truck is frictionally controlled and may readily be varied without varying the motor speed and said machine may be reversed without reversing the motor. Furthermore, the high and low speed frictionally controlled connections of the planetary geared speed reduction device 49, hereinbefore described, affords the desired relatively slow speed for feeding the cutting element to the coal and the relatively high speed for traveling from working place to working place and eliminates excessive wear and strain of the parts and the possibility of breakage thereof common to mechanisms of this character.

While I have herein shown and described one form in which my invention may be embodied, it will be understood that the construction and arrangement of the various parts may be altered or changed without departing from the spirit and scope thereof. Moreover, I do not wish to be construed as limiting myself to the particular or identical construction illustrated, excepting as it may be specifically limited in the appended claims.

I claim as my invention:

1. In a mining apparatus, the combination of a wheeled truck, a mining machine detachably mounted thereon comprising a frame, a motor, a cutter head including a cutting element operably driven from said motor, feed driving mechanism disposed rearwardly of said motor, said mechanism comprising a longitudinally extending drive shaft having a driving connection with said motor, a variable speed reduction device disposed on said shaft, a second longitudinally disposed shaft having a worm disposed thereon, said shaft having operable connection with said first mentioned drive shaft and adapted to be driven thereby at a plurality of speeds through said reduction device, a worm gear and shaft disposed on a vertical axis and operably driven by said worm, and truck driving means detachably connectible with said latter shaft.

2. In a mining apparatus, the combination of a truck provided with supporting wheels and axles, a mining machine detachably secured thereon comprising a frame, a motor, a cutter head driven from said motor, said head including a pivotally mounted kerf cutting element, feed driving mechanism disposed in said frame comprising a longitudinally extending drive shaft operably driven from said motor, a variable speed reduction device disposed on said shaft, a second longitudinally disposed shaft having a worm mounted thereon, a worm gear and shaft disposed on a vertical axis and driven by said worm, truck driving mechanism including a vertically movable coupling shaft disposed below and in alignment with said vertical shaft, a transversely disposed truck drive shaft being operably driven from said coupling shaft, and drive connections from said truck drive shaft to said truck axles.

3. In a mining apparatus, the combination of a truck provided with flanged supporting wheels and axles, a mining machine detachably secured thereon comprising a frame, a motor, a cutter head driven from said motor, said head including a pivotally mounted kerf cutting element, feed driving mechanism operably driven from said motor, said mechanism including a variable speed reduction unit, truck driving mechanism comprising a vertically disposed coupling shaft detachably connectible with said feed driving mechanism, said coupling shaft being provided with a bevel gear thereon meshing and driving a pair of oppositely disposed pinions mounted on a transversely extending truck drive shaft, and clutch means disposed on said last mentioned shaft intermediate said pinions for selectively engaging either thereof, whereby said truck may be propelled in either a forward or rearward direction.

4. In a mining apparatus, the combination of a truck provided with flanged supporting wheels and axles, a mining machine detachably secured thereon comprising a frame, a motor, a cutter head driven from said motor, said head including a pivotally mounted kerf cutting element, feed driving mechanism operably driven from said motor, said mechanism including a variable speed reduction unit, truck driving mechanism comprising a vertically disposed coupling shaft detachably connectible with said feed driving mechanism, said coupling shaft being provided with a bevel gear thereon meshing and driving a pair of oppositely disposed pinions mounted on a transversely extending truck drive shaft, said frame being provided with a pair of laterally extending pivotally mounted holding jacks adapted to fixedly secure said apparatus in a stationary position while cutting a kerf.

5. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a frictionally controlled plural speed gear reduction device, and means for driving said truck from said frictionally controlled plural speed gear reduction device comprising a worm driven by said plural speed gear reduction device, a worm gear driven thereby and a detachable drive connection from said worm gear to said truck.

6. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a frictionally controlled plural speed gear reduction device and means for driving said truck from said frictionally controlled plural speed gear reduction device at a plurality of predetermined frictionally controlled speeds in reverse directions without reversal of said motor comprising a worm driven by said frictionally controlled plural speed gear reduction device, a worm gear driven thereby and a detachable drive connection from said worm gear to the wheels of said truck including reverse gearing on said truck.

7. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed planetary gear reduction device, a worm driven by said plural speed planetary gear reduction device, a worm gear driven by said worm and means for driving said truck from said plural speed planetary gear reduction device at a plurality of predetermined speeds comprising a detachable drive connection from said worm gear to said truck.

8. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed planetary gear reduction device and a vertical shaft driven from said plural speed planetary gear reduction device, and means for driving said truck from said plural speed planetary gear reduction device at a plurality of predetermined speeds comprising a drive connection detachably connectible with said vertical shaft.

9. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed planetary gear reduction device and a vertical shaft driven from said plural speed planetary gear reduction device, and means for driving said truck from said plural speed planetary gear reduction device at a plurality of predetermined speeds comprising a geared drive connection detachably connectible with the under portion of said vertical shaft.

10. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed frictionally controlled planetary gear reduction device, a worm and worm gear driven thereby and means for driving said truck from said plural speed plentary gear reduction device at a plurality of frictionally controlled speeds comprising a detachable drive connection from said worm gear to said truck.

11. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed frictionally controlled planetary gear reduction device and a vertical shaft driven by said plural speed frictionally controlled planetary gear reduction device, and means for driving said truck from said plural speed frictionally controlled planetary gear reduction device at a plurality of frictionally controlled predetermined speeds comprising a drive connection detachably connectible with said vertical shaft.

12. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed frictionally controlled planetary gear reduction device and a vertical shaft driven by said plural speed frictionally controlled planetary gear reduction device, and means for driving said truck from said plural speed frictionally controlled planetary gear reduction device at a plurality of frictionally controlled predetermined speeds comprising a geared drive connection detachably connectible with the under portion of said vertical shaft.

13. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed planetary gear reduction device, a worm and worm gear driven thereby and means for driving said truck from said plural speed planetary gear reduction device at a plurality of predetermined speeds in reverse directions without reversal of said motor comprising a detachable drive connection from said worm gear to said truck and reverse gearing on said truck.

14. In a mining apparatus of the class described, a wheeled truck movable on a trackway, a mining machine detachably mounted thereon including a motor, a cutter bar extending forwardly therefrom, feeding mechanism on said mining machine, means for driving said feeding mechanism from said motor including a plural speed frictionally controlled planetary gear reduction device, a worm and worm gear driven thereby and means for driving said truck from said plural speed planetary gear reduction device at a plurality of frictionally controlled speeds in reverse directions without reversal of said motor comprising a detachable geared connection from said worm gear to said truck and reverse gearing on said truck.

15. In combination with a mining apparatus, a wheeled truck movable on a trackway, a mining machine detachably mounted thereon adapted to cut on its bottom along the mine bottom or from said wheeled truck, said mining machine including a motor, a cutter bar extending forwardly therefrom and feeding mechanism rearwardly of said motor comprising a feed operating drum, means for driving said feed operating drum from said motor including a plural speed gear reduction device and a vertical shaft driven by said plural speed gear reduction device, and means for driving said truck from said mining machine motor at a plurality of predetermined speeds comprising a shaft on said truck detachably connectible with the lower end of said vertical shaft.

16. In combination with a mining apparatus, a wheeled truck movable on a trackway, a mining machine detachably mounted thereon adapted to cut on its bottom along the mine bottom or from said wheeled truck, said mining machine including a motor, a cutter bar extending forwardly therefrom and feeding mechanism rearwardly of said motor comprising a feed operating drum, means for driving said feed operating drum from said motor including a frictionally controlled plural speed gear reduction device and a vertical shaft driven by said frictionally controlled plural speed gear reduction device, and means for driving said truck from said mining machine motor at a plurality of frictionally controlled speeds comprising a shaft on said truck detachably connectible with the lower end of said vertical shaft.

17. In combination with a mining apparatus, a wheeled truck movable on a trackway, a mining machine detachably mounted thereon adapted to cut on its bottom along the mine bottom or from said wheeled truck, said mining machine including a motor, a cutter bar extending forwardly therefrom and feeding mechanism rearwardly of said motor comprising a feed operating drum, means for driving said feed operating drum from said motor including a plural speed planetary gear reduction device and a vertical shaft driven by said planetary gear reduction device, and means for driving said truck from said mining machine motor at a plurality of predetermined speeds comprising a shaft on said truck detachably connectible with the lower end of said vertical shaft.

18. In combination with a mining apparatus, a wheeled truck movable on a trackway, a mining machine detachably mounted thereon adapted to cut on its bottom along the mine bottom or from said wheeled truck, said mining machine including a motor, a cutter bar extending forwardly therefrom and feeding mechanism rearwardly of said motor comprising a feed operating drum, means for driving said feed operating drum from said motor including a frictionally controlled plural speed planetary gear reduction device and a vertical shaft driven by said frictionally controlled plural speed planetary gear reduction device, and means for driving said truck from said mining machine motor at a plurality of frictionally controlled predetermined speeds comprising a shaft on said truck detachably connectible with the lower end of said vertical shaft.

Signed at Chicago, in the county of Cook and State of Illinois, this 23rd day of December, A. D. 1926.

FRANK A. LINDGREN.